United States Patent [19]
Chaiken

[11] Patent Number: 6,055,643
[45] Date of Patent: Apr. 25, 2000

[54] SYSTEM MANAGEMENT METHOD AND APPARATUS FOR SUPPORTING NON-DEDICATED EVENT DETECTION

[75] Inventor: Craig L. Chaiken, Tomball, Tex.

[73] Assignee: Compaq Computer Corp., Houston, Tex.

[21] Appl. No.: 08/937,853

[22] Filed: Sep. 25, 1997

[51] Int. Cl.[7] .................................................. G06F 1/26
[52] U.S. Cl. ........................................................ 713/323
[58] Field of Search ........................ 395/750.02, 750.05, 395/750.06, 868, 734, 739; 713/310, 323, 324; 710/48, 261, 266

[56] References Cited

U.S. PATENT DOCUMENTS

| | | | |
|---|---|---|---|
| 4,051,326 | 9/1977 | Badagnani et al. | 395/750.02 |
| 5,551,044 | 8/1996 | Shah et al. | 395/750.05 |
| 5,652,894 | 7/1997 | Hu et al. | |
| 5,721,937 | 2/1998 | Kurihara et al. | 395/750.05 |
| 5,758,172 | 5/1998 | Seo | 395/750.01 |
| 5,805,910 | 9/1998 | Lee et al. | 395/750.05 |
| 5,842,028 | 11/1998 | Vajapey | 395/750.02 |
| 5,845,138 | 12/1998 | Nowlin, Jr. | 395/750.05 |

FOREIGN PATENT DOCUMENTS

| | | |
|---|---|---|
| 0 701 194 | 3/1996 | European Pat. Off. . |
| 43 37 055 | 5/1994 | Germany . |
| 43 42 220 | 6/1994 | Germany . |

OTHER PUBLICATIONS

Search Report mailed Feb. 26, 1999 for application EP 98 30 7559.
82371AB PCI–TO–ISA/IDE Xcelerator (PIIX4) Manual, Intel Corporation, Apr. 1997, pp. 1–284.
Advanced Configuration and Power Interface Specification, Intel, Microsoft, Toshiba Revision 1.0, Dec. 22, 1996, pp. 1–262.

*Primary Examiner*—Glenn A. Auve
*Attorney, Agent, or Firm*—Conley, Rose & Tayon; Robert C. Kowert

[57] ABSTRACT

A method is provided for creating a virtual operating system directed power management event. The method may include executing a prepare-to-sleep routine in a computer system running an Advanced Configuration and Power Interface (ACPI) compliant operating system. The prepare-to-sleep routine may include programming ACPI compliant core logic such as the Intel PIIX4 device to generate an I/O trap system management interrupt (SMI) upon accesses to the ACPI WAK_STS register. The prepare-to-sleep routine may also enable non-dedicated event signals, such as legacy IRQs, to serve as resume events. After a resume event, the operating system reads the WAK_STS register. Upon access to the WAK_STS an SMI is generated. An SMI handler may be executed that determines if the resume event was generated by a wake device. If the resume event was in response to a non-dedicated event signal such as a legacy IRQ, the handler writes to a configuration register in the core logic which causes an unused dedicated event signal to appear as if it was asserted in the ACPI general purpose event register. Upon a subsequent access of the general purpose event register, the operating system will now recognize an ACPI compliant event. Alternatively, the core logic may be modified to include an event status/enable pair for each legacy IRQ.

35 Claims, 6 Drawing Sheets

SYSTEM MANAGEMENT METHOD AND APPARATUS FOR SUPPORTING NON-DEDICATED EVENT DETECTION

BACKGROUND OF THE INVENTION

1. Field of the Invention

This invention relates to operating system directed system management in computer systems, and more particularly to the detection of system management events, such as power management events, in a computer system employing operating system directed system management.

2. Description of the Related Art

In conventional modern computer systems, it desirable to be able to perform system management functions such as power management, system configuration, and thermal monitoring. A typical computer system may have dedicated hardware and software routines for performing the system management functions. For example, a computer system may include hardware for power management that slows down or disables power to certain sections of the computer system. Event monitoring hardware may also be included to indicate when various power management states should be transitioned to. Software routines may be provided that respond to hardware events to place the computer into low power or sleep states or wake the computer by transitioning to working states. Typically, such software routines are not part of the high level operating system, but are lower level routines, or BIOS routines provided by the system manufacturer. As a result, such system management routines may vary greatly between system manufacturers and between classes of computers such as desktop, mobile, home, and server computers. Thus, a recent trend has been to move many of the system management functions into the operating system to provide a well defined system management or power management mechanism across various manufacturers and classes of computers. However, it is desirable for operating system directed power management or system management to still recognize events from old or legacy hardware devices.

The Advanced Configuration and Power Interface (ACPI) specification is an example of a specification for an operating system directed power management mechanism. The ACPI specification is being jointly developed by Intel, Microsoft and Toshiba and is herein incorporated by reference. A computer system supporting ACPI includes ACPI compliant core logic and an ACPI compliant operating system. An example of an ACPI compliant operating system is the upcoming Microsoft Memphis or Windows 98 operating system. An example of ACPI compliant core logic is the Intel PIIX4 chip set. ACPI supports various power management states as described in the ACPI specification. When an ACPI compliant computer system is in a power-on-suspend (POS) state, if a wake up device such as a keyboard or modem wants to wake the computer system from the power-on-suspend state to a working state, it must generate a ACPI compliant wake event. Current ACPI compliant operating systems, such as Microsoft's Memphis, will only recognize a resume event as an ACPI compliant wake event if the event is indicated in an ACPI general purpose event register. Current ACPI core logic devices, such as the Intel PIIX4 chip set, implement the ACPI general purpose event register. However, only wake up devices with a dedicated signal to the core logic can cause an event to be indicated in the ACPI general purpose event register. In other words, a wake up device must be hard wired to the ACPI general purpose event register in order to be able to indicate a wake up event that will be recognized by the ACPI compliant operating system.

New computer systems may be designed with devices that are capable of generating events on dedicated signals to the ACPI core logic so that wake events may be indicated in the general purpose event register. For example, dedicated signals may be provided for thermal events, keyboard activity, modem ring indication, etc. However, it is also desirable to be able to take advantage of operating system directed power management in a computer system utilizing older devices that are not connected to a dedicated signal to the general purpose event register. For example, an old style keyboard, mouse, or modem would not have a connection to the dedicated general purpose event register signals. Typically these types of devices use interrupt request signals to indicate a resumption of activity. Also, even for new devices it may not be practical to add dedicated ACPI event signals from the device to the ACPI general purpose event register. Adding ACPI event signals to new devices would add cost and complexity. More importantly it precludes the use of existing ISA or PCI cards as wake up devices because they lack hard wired wake up signals.

One solution for allowing a new PCI or ISA card to be able to generate ACPI compliant wake up events would be to use one of the reserved PCI or ISA connector signals for the dedicated general purpose event register signal. Alternatively, a dedicated side band cable could be used to provide the dedicated signal from the PCI or ISA card to the general purpose event register, however, these solutions are unsatisfactory. Using the reserved PCI or ISA signals may interfere with future modifications to those buses. A dedicated side band cable adds cost and complexity to the system. Furthermore, neither of those solutions would allow existing ISA or PCI cards to act as wake up devices because existing cards lack a dedicated wake up event signal.

Therefore it is desirable to be able to wake a computer running an operating system directed power management mechanism such as an ACPI operating system from a power-on-suspend state upon detecting an event from a legacy (non ACPI compliant) wake up device such as a keyboard, mouse or modem. Existing ACPI chip sets allow only hard wired signals to generate ACPI compliant wake events. It is desirable to have a solution to allow the generation of ACPI compliant wake events upon resuming from a power-on-suspend state. This would permit any event capable of resuming from a power-on-suspend state to generate an ACPI compliant wake event without adding hard wired ACPI wake signals. In other words, it is desirable to provide for new and existing wake up devices to be able to generate wake events that will be recognized by an operating system directed power management mechanism without the addition of dedicated hardware signals.

SUMMARY OF THE INVENTION

The problems outlined above may in large part be solved by a computer program method that allows an operating system recognizable management event to be generated in response to a non-dedicated event signal such as a legacy IRQ signal. The invention provides a software method for generating a simulated or virtual wake up event upon resuming a computer from a power-on-suspend state. The invention involves programming core logic in the computer system to generate an I/O trap system management interrupt upon accesses to a status register such as the ACPI wake status register. The method includes enabling legacy IRQ's as power-on-suspend resume events so that the core logic will generate a system control interrupt to indicate the occurrence of a resume event in response to assertion of an enabled IRQ. The operating system will read the wake status register in response to the system control interrupt. Upon accessing the wake status register, an I/O trap SMI will occur. The invention includes and SMI handler which determines if the resume event was generated by a wake device using a non-dedicated event signal such as a legacy IRQ. The SMI handler writes to a configuration register to toggle the polarity of an unused dedicated event signal to create a simulated, or virtual, ACPI event. Toggling polarity renders an inactive signal active. When the operating system again reads the wake status register and event status register a valid ACPI event will now be recognized. The operating system will execute the control method associated with this signal. The control method involves toggling the virtual ACPI signal polarity to prevent further ACPI events from being detected and notifying the operating system that a valid wake event has occurred. Thus, this invention allows any event, most notably an interrupt request, which is able to resume a computer from a power-on-suspend state to generate a ACPI compliant wake event. Therefore the invention allows devices that are not hardwired to the ACPI general purpose event register to still generate ACPI events recognizable by the operating system. This means that existing ISA or PCI cards, for example, may generate ACPI wake up events or other management events and that new ISA or PCI cards or motherboard devices need not add dedicated ACPI signals or side band cables.

Generally speaking, the present invention contemplates a method for enabling an operating system to wake a computer from a low power state in response to an interrupt request. The method includes programming core logic to generate a system interrupt in response to the operating system accessing a wake status register. When the system interrupt is generated in response to access of the wake status register, the method determines if an interrupt request has been generated by one or more wake up devices. If an interrupt request has been generated by a wake device, the method includes causing an event register to indicate a wake up event has occurred. When the operating system subsequently reads the event register, the operating system will wake the computer from the low power state.

Programming the core logic to generate a system interrupt in response to accesses of the wake status register may be accomplished as part of a prepare-to-sleep routine executed by the operating system prior to transitioning the computer to a low power or power-on-suspend state. The prepare-to-sleep routine may further include enabling at least one interrupt request signal as a resume event. When a wake up device generates an interrupt request on an interrupt request signal enabled as a resume event, the core logic may resume CPU operation (start the CPU clock). The prepare-to-sleep routine may also include enabling other non-dedicated event signals as resume events. The system management interrupt generated in response to the accesses of the wake status register may be a system management interrupt (SMI).

The method of the present invention also includes an interrupt handler as executed in response to a system interrupt generated when the wake status register is accessed. The interrupt handler includes checking for pending keyboard or mouse data or a modem ring indicate status. If the resume event was generated by an IRQ from one of these devices or other devices, the handler includes writing a configuration register that causes an unused dedicated event signal to appear as if it had been asserted to the event register, whereby the event register will indicate a wake up event has occurred. After causing this simulation of a wake up event, the handler may program the core logic to disable generating the system interrupt in response to accesses of the wake status register.

In response to the simulated wake up event, the operating system may execute a control method associated with the event. The control method includes clearing the simulated wake up event in the event register in order to prevent the same wake up event being detected again by the operating system.

The method of the present invention may be applied to a computer system running an operating system complying with the Advance Configuration and Power Interface (ACPI) specification. The core logic operated upon by the method of the invention may include the Intel PIIX4 integrated circuit device. Wake up devices may include a keyboard, mouse or modem.

In a preferred embodiment, the method of the present invention may include a method for simulating a ACPI compliant wake event in response to wake devices that do not have a dedicated hardware connection to an ACPI general purpose event register in a computer system executing an ACPI compliant operating system. This method includes executing a prepare-to-sleep routine prior to the operating system transitioning the computer to a power-on-suspend state. The prepare-to-sleep routine includes programming a core logic device to generate a system management interrupt upon accesses to the ACPI status wake register. The prepare-to-sleep routine also includes programming the core logic device to enable resume events associated with such wake devices. The core logic device resumes the computer in response to occurrence of enabled resume events and the operating system polls or "spins on" the ACPI wake status register. In response to a system management interrupt generated upon an access to the ACPI wake status register, the method includes executing an SMI handler. The SMI handler includes determining if the resume event was caused by one of the wake devices that does not have a dedicated hardware connection to the ACPI general purpose event register. If the resume event was so caused, the SMI handler includes writing a configuration register in the core logic device that causes the ACPI general purpose event register to indicate the occurrence of an ACPI compliant wake event. The handler will also disable the core logic device from generating an SMI upon subsequent accesses to the wake status register.

Upon a subsequent access to the wake status register, the operating system will now recognize a valid ACPI event and execute a control method according to the present invention. The control method may include writing the configuration register in the core logic to clear indication of the occurrence of an ACPI event in the general purpose event register. The control method may also include notifying the operating system that a wake event has occurred.

Non-dedicated signals that may be enabled as resume events and used to generate simulated ACPI compliant events as described above may include interrupt request signals and, in a preferred embodiment, legacy IRQ signals. Legacy IRQ signals include ISA type interrupt request signals.

The present invention also contemplates a computer system including a core logic device that includes a event enable and status bit pair for one or more interrupt request signals. This embodiment of the present invention is an alternative to the computer program method described above. The enable and status bit pair is in an event register block accessed by the operating system for recognizing events for operating system directed management. By including such register bits, wake up devices that are capable of generating interrupt requests may also generate operating system recognizable system or power management events. Also, such events may be generated by IRQ generating devices regardless of the state of the IRQ mask in the programmable interrupt controller of the computer system.

This invention contemplates a computer system including a central processing unit configured to execute an operating system that directs system and/or power management in the computer system. The computer system also includes system memory coupled to the CPU and core logic coupled to the CPU. The core logic is adapted to receive one or more interrupt request signals and to generate an operating system interrupt in response to an interrupt request on one or more of the interrupt request signals when the computer system is in a low power state. The operating system will recognize this as a wake event and wake the computer system from the low power state in response to the operating system interrupt. The computer system includes one or more wake devices adapted to generate the interrupt request on one or more of the interrupt request signals. The core logic includes an enable register and a status register for the interrupt request signals. Setting a corresponding bit in the enable register enables one of the interrupt request signals to cause the core logic to generate the operating system interrupt and clearing the corresponding bit disables the interrupt request signal from causing the core logic to generate to operating system interrupt. The enable register may be part of an ACPI general purpose event enable register and the status register may be part of an ACPI general purpose event status register. The interrupt request signals may be legacy IRQ signals. The computer system may also include a programmable interrupt controller for interrupting the CPU in response unmasked interrupt requests on the interrupt request signals. However, the operating system interrupt may be generated regardless of the interrupt request mask in the programmable interrupt controller. Wake up devices may include a modem, keyboard, mouse, real-time clock, uninterruptable power supply, thermal sensor or any other interrupt generating device found in conventional computer systems. Run-time devices such as a real-time clock or uninterruptable power supply may also generate events for system management recognizable by the operating system according to this invention. For example, when the computer system is in a high power state, the core logic may generate an operating system interrupt in response to an interrupt request from one of these run-time devices regardless of the interrupt request mask in the programmable interrupt controller.

A computer system employing the method or core logic according to the present invention allows a wake up device such as an ISA or PCI card or motherboard device that is capable of generating an IRQ to generate an operating system recognizable event or ACPI compliant event without the addition of a dedicated event signal. Thus, the present invention reduces the cost and wiring complexity of ACPI compliant computers or other operating system directed system management computers while dramatically increasing the number of devices that can generate operating system recognizable events.

BRIEF DESCRIPTION OF THE DRAWINGS

Other objects and advantages of the invention will become apparent upon reading the following detailed description and upon reference to the accompanying drawings in which.

Figure 1:
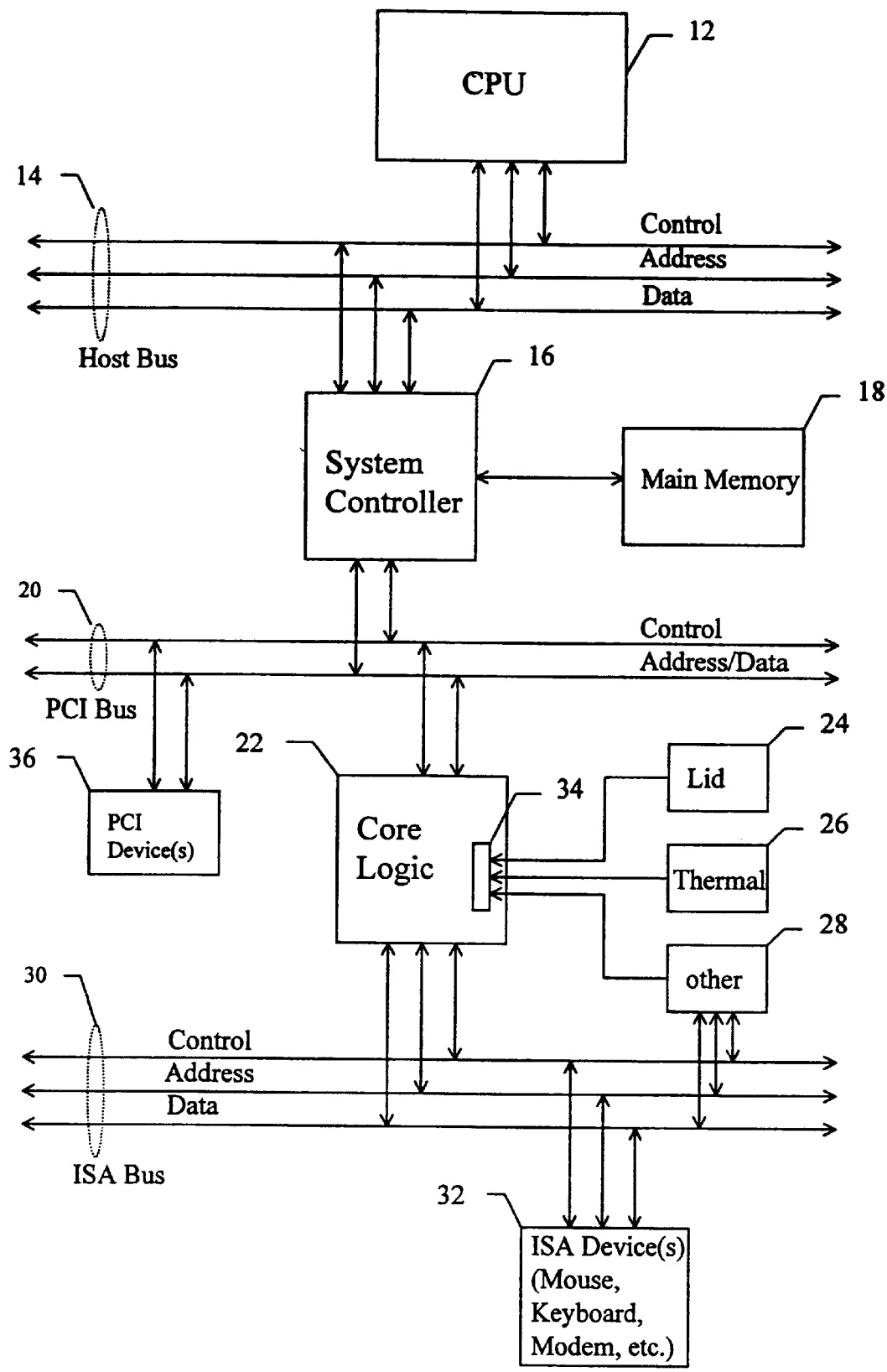
FIG. 1 is a block diagram of a computer system comprising core logic according to a first embodiment of the present invention.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to the drawings, FIG. 1 illustrates a computer system including a central processing unit (CPU) 12 coupled to a host bus 14. Host bus 14 includes control, address and data signals for communicating with system controller 16 and main memory 18. System controller 16 provides an interface between CPU 12 and main memory 18. Other devices not shown, such as a second level cache, may be coupled to host bus 14 and system controller 16. System controller 16 also provides an interface between host 14 and PCI bus 20 to allow communication between the CPU bus and PCI devices and between PCI devices and main memory 18. Core logic 22 provides interface between PCI bus 20 and ISA bus 30. Core logic 22 may include a general purpose event register 34 which receives dedicated signals from various devices. For example, general purpose event register 34 may receive event indication from circuitry indicating the status of the lid in a clam shell style note book computer, as represented by reference numeral 24. Dedicated event signals may also be provided by thermal monitoring logic 26 or other event logic 28. One or more I/O devices may be coupled to ISA bus 30 as indicated by reference numeral 32.

CPU 12 may be any conventional microprocessor such as an X86 style microprocessor, Pentium, Power PC microprocessor, etc. Host bus 14 may be a high speed bus including control, address, and data signals that provides for communication between the devices connected to the host bus.

System controller 16 may be an integrated circuit device such as the Intel TXC chip set. System controller 16 forms a host to PCI bridge. System controller 16 also provides the interface to main memory 18. Main memory 18 may be DRAM, EDO DRAM, SDRAM, or any other suitable main memory devices.

PCI bus 20 includes control and address signals for providing an interface between PCI devices 36 and system controller 16. PCI devices 36 may include I/O devices such as a hard drive controller or a network card. In a preferred embodiment, core logic 22 may be the Intel PIIX4 integrated circuit device. In addition to providing the interface between PCI bus 20 and ISA bus 30, core logic 22 may also provide other computer system functions such as timer/counter logic, DMA interface, universal serial bus (USB) interface, X-bus support logic, and an IDE hard driver interface. For simplicity, these other interfaces are not shown in FIG. 1. Also, it is not necessary that the functionality as shown in FIG. 1 be partitioned as indicated. Alternatively, core logic 22 may be divided into multiple integrated circuit devices.

Figure 2:
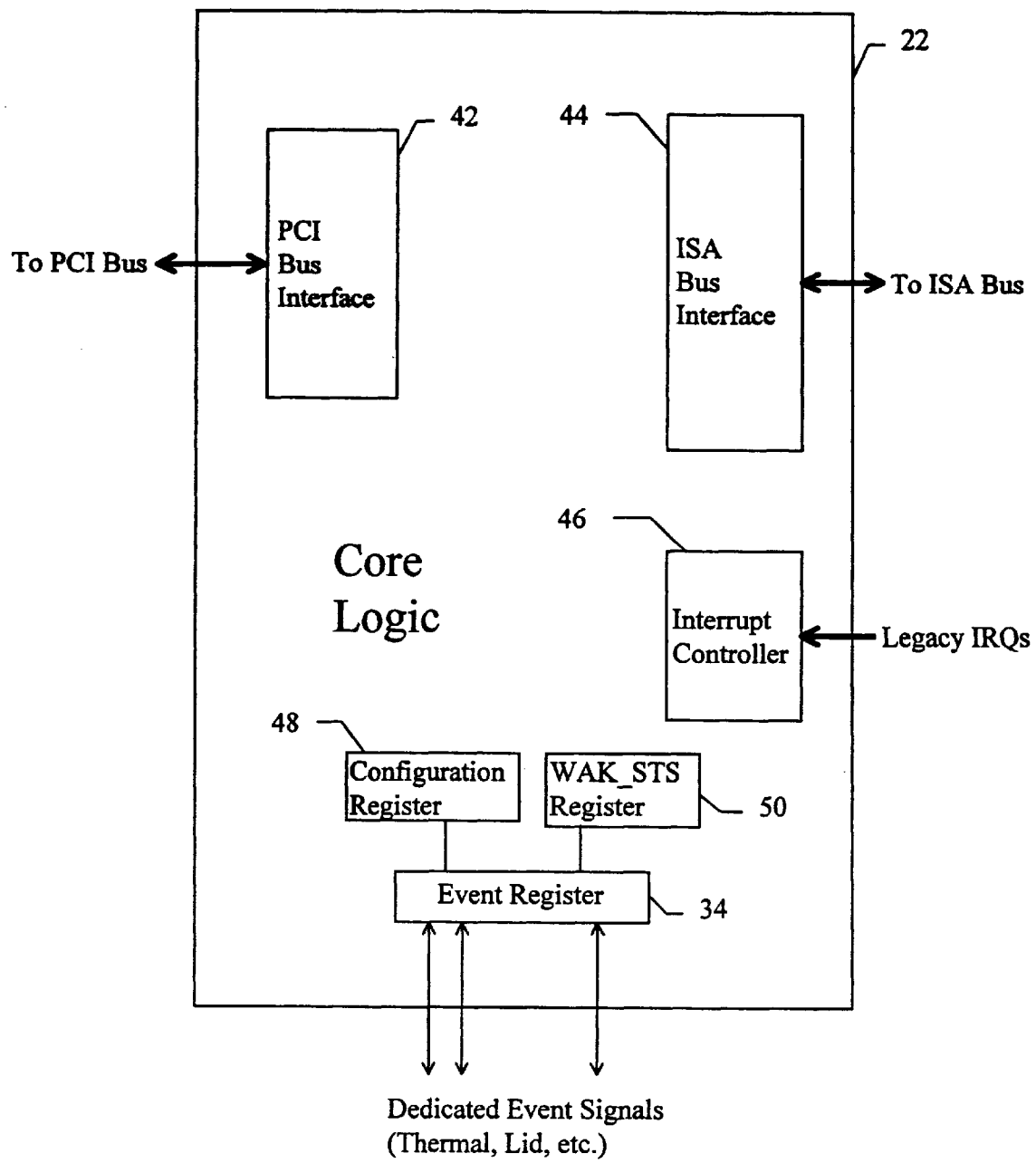
FIG. 2 is a block diagram of the core logic illustrated in FIG. 1.

Turning now to FIG. 2, a block diagram of some of the functional units of core logic 22 is illustrated. Only the functionality necessary for the understanding of the present invention is indicated in FIG. 2. Other functionality, as described above, is not illustrated for simplicity. Core logic 22 includes PCI bus interface 42 and ISA bus interface 44. Core logic 22 also includes an interrupt controller 46 that receives ISA interrupt request signals. These interrupt request signals are referred to as legacy IRQ's. Core logic 22 also includes several registers accessible by the operating system for operating system directed system management. Event register 34 receives dedicated event signals from devices such as thermal monitoring logic, lid indication, etc. The operating system is able to detect events from these devices by accessing event register 34. Certain of the events may be enabled as wake up events. Wake status register 50 indicates when one of the enabled wake up events occurs. The operating system may access wake status register 50 to learn if a wake up event has occurred. Other events such as legacy IRQ's may also be enabled in core logic 22 to resume the computer from a power-on-suspend state. However, current operating systems will not recognize an event as a valid wake up event unless a corresponding bit is set in event register 34. Thus, in conventional systems only wake up devices with dedicated event signals to event register 34 may serve as operating system recognizable wake devices.

Figure 3:
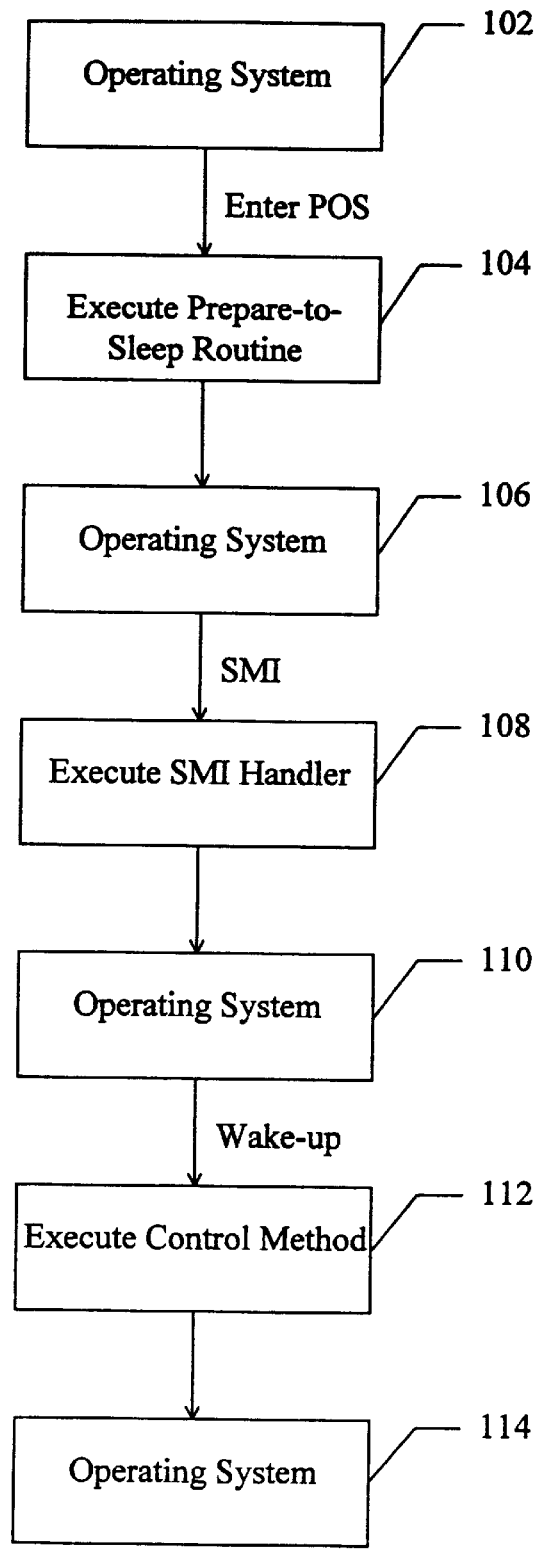
FIG. 3 is a flow diagram for a method according to one embodiment of the present invention for simulating an operating system recognizable system or power management event in response to a non-dedicated event signal.

Turning now to FIG. 3, a method is illustrated for allowing devices that do not have a dedicated event signal to serve as wake up devices in a system as described for FIGS. 1 and 2. The method illustrated in FIG. 3 may be implemented as computer programs in the computer of FIG. 1. The present invention provides a software method to generate a simulated wake up event upon resuming from a power-on-suspend state in a computer system as described in FIGS. 1 and 2. In a preferred embodiment, the computer system may employ ACPI compliant core logic and an ACPI compliant operating system. Reference numeral 102 indicates the computer system operating under control of the operating system in a working state. When the operating system decides to enter a low power state, such as a power-on-suspend state, the operating system will cause a prepare-to-sleep routine to be executed as indicated by reference numeral 104. The prepare-to-sleep routine is not part of the operating system, but is designed to function with the operating system. The prepare-to-sleep routine includes programming the core logic to generate a system interrupt in response to the operating system accessing the wake status (WAK—STS) register 50. Current ACPI compliant core logic, such as the Intel PIIX4, may be programmed to generate an I/O trap system management interrupt (SMI) upon reading the ACPI wake status I/O port. Therefore, in a system utilizing the Intel PIIX4, the prepare-to-sleep routine would program the PIIX4 device to generate an I/O trap SMI when the operating system accesses the wake status I/O port. The prepare-to-sleep routine also enables legacy IRQ's as resume events.

Also, any other resume event associated with a wake device may be enabled. Control is returned to the operating system as indicated by reference numeral 106. The operating system transitions the computer to a power-on-suspend state or low power state. When a resume event occurs in the computer system, the core logic may resume CPU operation by restarting the CPU clock. A tight code loop is run that reads the wake status register 50 to see if a wake event has occurred. Thus, upon resume, the wake status register 50 may be polled in a tight code loop by the operating system.

When the wake status register 50 is read, a system management interrupt (SMI) will be generated, since the core logic was so programmed by the prepare-to-sleep routine as indicated at reference numeral 104. An SMI is not handled by the operating system, but instead is handled by an SMI handler according to the present invention, as indicated at reference numeral 108. The SMI handler includes determining if a resume event has been generated by a wake up device that does not have a dedicated signal to the general purpose event register. The SMI handler may determine if an interrupt request has been generated by a wake up device. For example, an edge triggered legacy IRQ assertion may have been enabled as a resume event. The SMI handler checks the status of wake up devices to see if any of the wake devices have asserted such an interrupt request. The SMI handler may read the standard I/O ports for determining if there is pending keyboard or mouse data which would indicate one of those devices had asserted an interrupt request. Also, the SMI handler may check the ring indication status in one or more modem UARTs. Other wake devices with non-dedicated general purpose event register signals may also be checked by the SMI handler. If the resume event was caused by one of these wake devices, the SMI handler causes the general purpose event register to indicate that a wake up event has occurred. This is accomplished by writing to a bit in configuration register 48 that corresponds to a bit in the general purpose event register 34 that corresponds to an unused dedicated event signal. Core logic 22 allows a bit in event register 34 corresponding to an unused dedicated event signal to be toggled by writing to configuration register 48. Therefore, if one of the dedicated event signals, such as the thermal signal or lid signal, is permanently tied to a high or low voltage and not connected to a device, a wake up event may be simulated in the event register 34 by writing to configuration register 48 to cause the corresponding bit to be toggled in event register 34. After simulating the occurrence of a wake event in event register 34, the SMI handler will program core logic 22 to disable assertion of the SMI when wake status register 50 is accessed.

The SMI handler then returns control to the operating system as indicated by reference numeral 110. When the operating system again reads the wake status and event registers a valid wake up event will now be indicated and recognizable by the operating system. The operating system will then cause a control method associated with the wake up event to be executed as indicated by reference numeral 112. The control method includes writing to configuration register 48 to clear the simulated wake up event in the event register 34. The control method will then notify the operating system that a valid wake event has occurred and pass control back to the operating system as indicated at reference numeral 114. The operating system will then proceed to complete the process of waking the computer system into a full working state. Thus, the present invention allows any event, including legacy IRQs, to serve as resume events for a computer in a power-on-suspend state and to be recognized by the operating system as wake up events. The present invention allows devices that are not hard wired to the general purpose event register to generate wake up events that will be recognized by an operating system performing operating system directed power management. Therefore, existing ISA or PCI devices may be used to generate operating system recognizable wake up events and new ISA or PCI devices or motherboard devices need not use reserve signals or side band cables to be able to indicate an event in the general purpose event register.

Figure 4A:
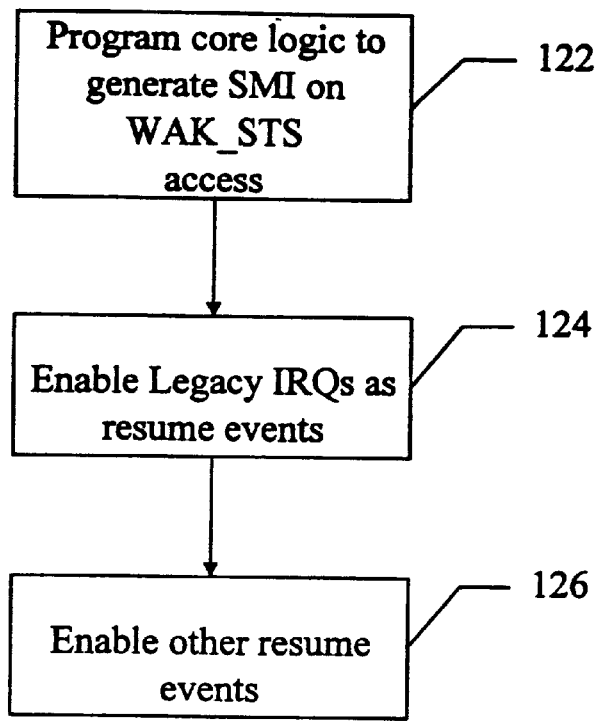
FIG. 4A is a flow diagram a prepare-to-sleep routine which may be included in the method of FIG. 3.

Turning now to FIG. 4A. A more detailed flow chart is shown illustrating the prepare-to-sleep routine indicated by reference numeral 104 in FIG. 3. The operating system causes the prepare-to-sleep routine to be executed prior to transitioning the computer into the power-on-suspend state. In a preferred embodiment, the prepare-to-sleep routine will program the core logic to generate an I/O trap SMI upon an I/O access to the wake status register, as indicated by reference numeral 122. An example of core logic that may be programmed to generate an I/O trap SMI upon I/O accesses to a wake status register is the Intel PIIX4 device. The prepare-to-sleep routine will also enable unmasked IRQ's to be power-on-suspend resume events. In one embodiment these IRQ's may be legacy IRQ's. The Intel PIIX4 device may be programmed to enable IRQ's as power-on-suspend resume events. The prepare-to-sleep routine may also enable any other power on resume events associated with wake devices within the computer system as indicated by reference numeral 126. After execution of the prepare-to-sleep routine illustrated by FIG. 4A, the operating system issues instructions to transition the computer into the power-on-suspend state.

Figure 4C:
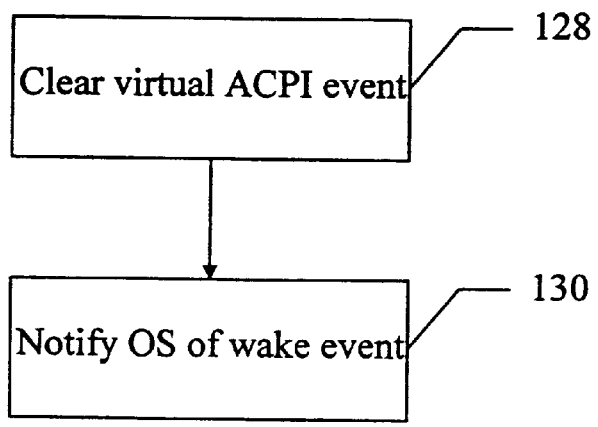
FIG. 4C is a flow diagram of a control method which may be included in the method of FIG. 3.
Figure 4B:
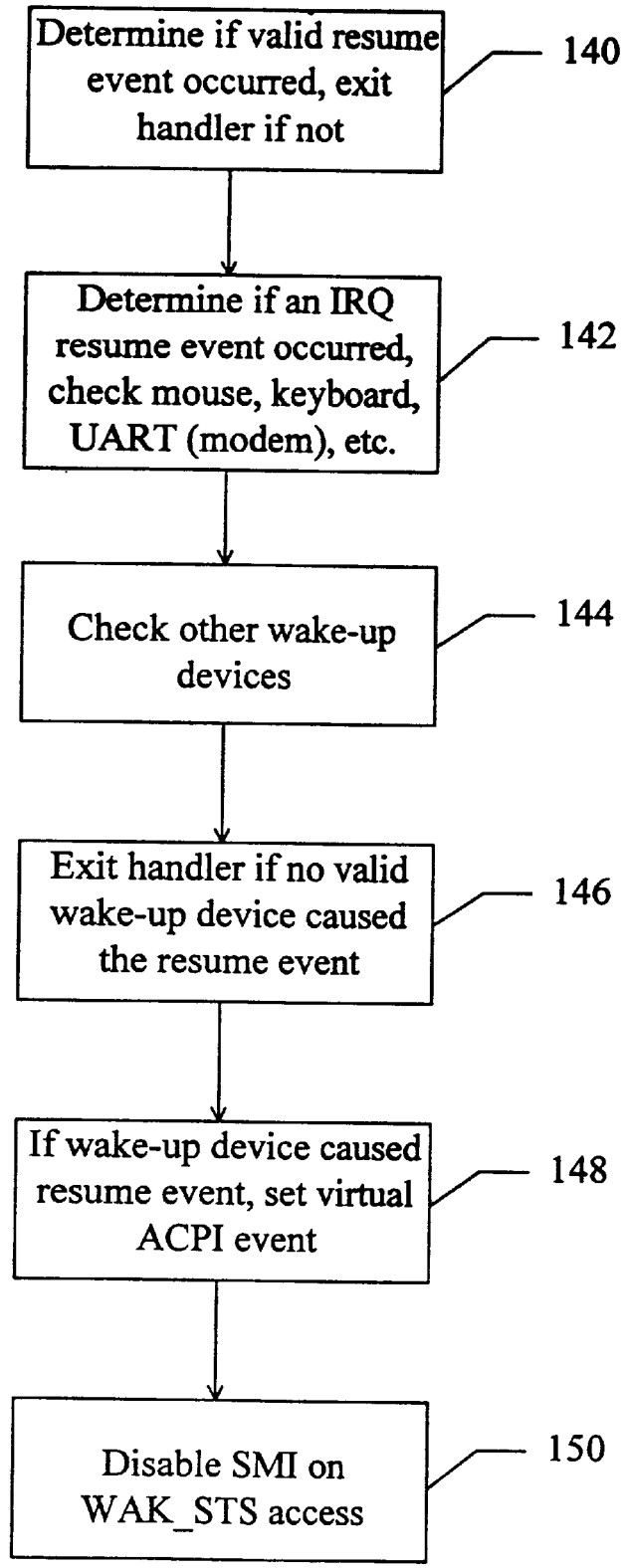
FIG. 4B is a flow diagram of a system interrupt handler routine which may be included in the method of FIG. 3.

Turning now to FIG. 4B, a more detailed illustration of the SMI handler indicated by reference numeral 108 in FIG. 3 is illustrated. The SMI handler is executed in response to an I/O trap SMI generated by an access of the wake status register. The wake status register may have been accessed by periodic polling of the wake status register by the operating system. The SMI handler determines if a resume event has occurred by accessing the appropriate register in the core logic. If no resume event has occurred, the handler is exited. This operation is indicated by reference numeral 140 in FIG. 4B. Next, the SMI handler determines if the resume event was generated by a wake device and more specifically if it was an IRQ resume, as indicated by reference numeral 142. The SMI handler may check keyboard and mouse I/O ports and a modem UART port to see if one of these wake devices is responsible for the IRQ resume. A mouse or keyboard wake up device may have generated an IRQ to indicate pending data or the modem to indicate a ring status. Other non-IRQ wake devices may be checked to see if they are responsible for the resume event as indicated by reference numeral 144. If the SMI handler determines that no valid wake device caused the resume event, the handler is exited as indicated by reference numeral 146. If a wake up device did cause a resume event, the SMI handler causes the event register to indicate that a wake up event has occurred so that the wake up event may be recognized by the operating system. This may be accomplished by toggling the polarity of an unused dedicated event signal in the event register by writing to a corresponding configuration register. In the ACPI compliant system, this operation may be referred to as creating a virtual ACPI event or a simulated ACPI event since the event did not occur from a dedicated event signal, but instead was created by the SMI handler in response to a IRQ or other non-dedicated event signal. Creation of the virtual ACPI event is represented by reference numeral 148.

Next, the SMI handler will program the core logic to disable generation of the I/O trap SMI upon I/O accesses to the wake status register as indicated by reference numeral 150.

Turning now to FIG. 4C. A flow diagram of the control method caused to be executed by the operating system in response to a wake up event in the event register is illustrated. The control method involves clearing the virtual ACPI by toggling the virtual ACPI signal polarity. Clearing the virtual event prevents further, i.e. redundant, events from being detected by the operating system. Clearing the virtual event is represented by reference numeral 128. The control method then notifies the operating system that a valid wake event has occurred and control is returned to the operating system.

The above described invention provides a solution to the problem of generating a system management event or wake event in a system utilizing operating system directed system management or power management. Current systems utilizing operating system directed power and system management mechanisms only recognize events that are generated from a dedicated hardware signal to an event register accessed by the operating system. This invention allows other devices to create system or wake up events when the devices do not support a dedicated event signal. The invention involves simulating a dedicated event in the event register in response to another event such as a legacy IRQ. The above described computer system hardware and computer program methods are exemplary of this invention. However, the invention is not limited to these embodiments. For example, the computer program routines illustrated in FIGS. 3 and 4A–C may include other functionality in addition to that necessary for creating an operating system recognizable event in response to a legacy event. Further more, the computer system hardware is not limited to the embodiments of FIGS. 1 and 2. For example, the computer system may have only a single peripheral bus and the necessary core logic to implement the present invention may be included in the system controller device or as discreet devices.

Figure 5:
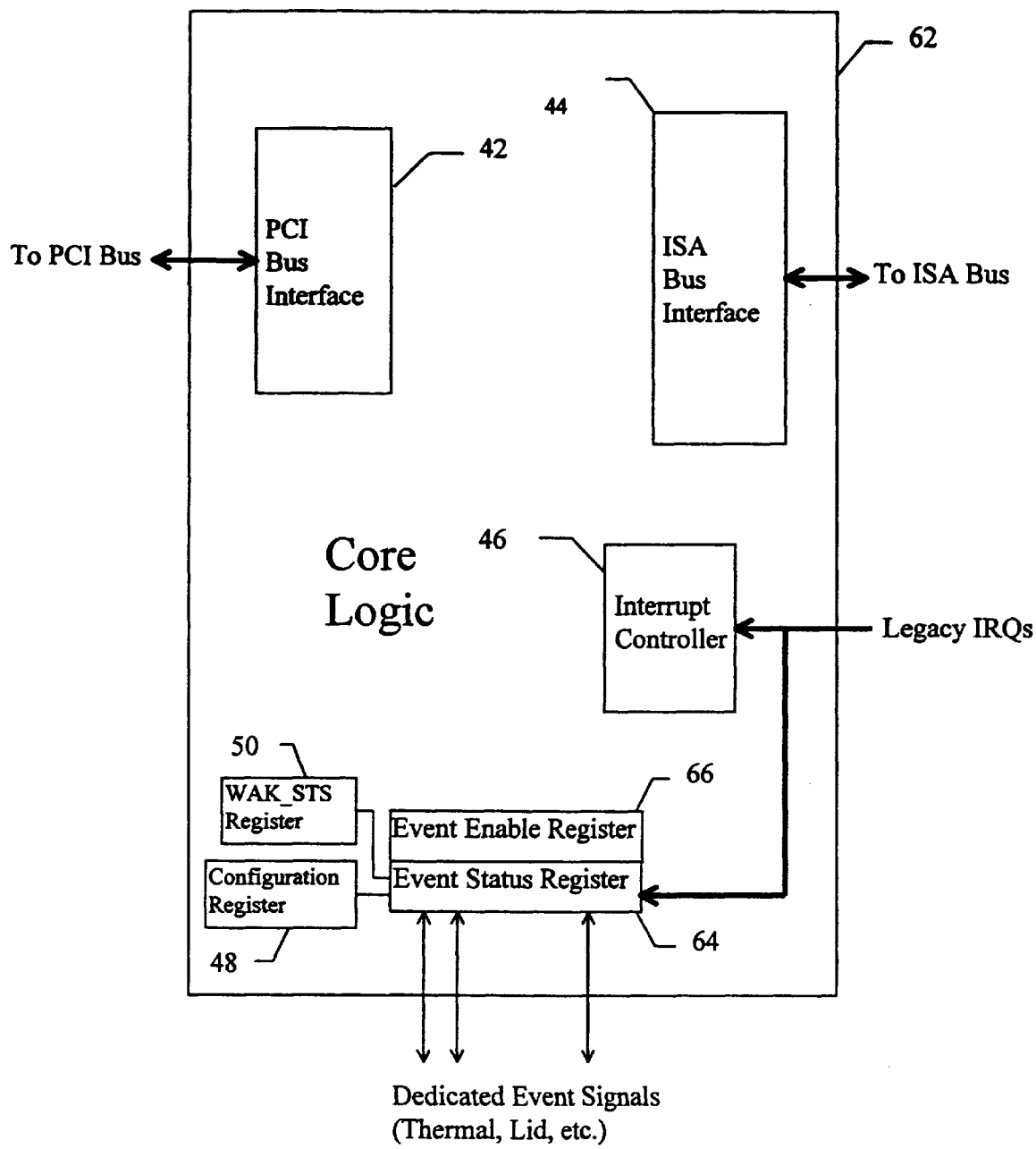
FIG. 5 is a block diagram core logic according to a second embodiment of the present invention for allowing a non-dedicated signal to be recognized by the operating system as a system or power management event.

Turning now to FIG. 5. A block diagram is shown illustrating core logic 62 for implementing a hardware solution to allow operating system recognizable events to be indicated by non-dedicated signals. This solution is a modification to core logic 22 illustrated in FIGS. 1 and 2. The logic illustrated in FIG. 5 allows an operating system recognizable event to be generated in a computer system running an operating system directed system or power management mechanism upon the detection of non-dedicated event signals such as interrupt request signals or legacy IRQ's. Core logic 62 includes a PCI bus interface 42 and an ISA bus interface 44 for interfacing to these two busses, respectively, and allowing communication between the two busses. Core logic 62 also includes interrupt controller 46. Interrupt controller 46 may function as two cascaded 8259 type interrupt controllers. Interrupt controller 46 receives the interrupt requests, or legacy IRQ's signals. Core logic 62 also includes an event status register 64 and an event enable register 66. An enable/status bit pair is provided for each dedicated event signal, such as a thermal or a lid signal. An enable/status bit pair is also provided for each IRQ signal. Wake status register 50 and configuration register 48 are also included in core logic 62.

Event enable register 66 and event status register 64 may be the ACPI general purpose event and status registers and will be referred to in these terms hereinafter. If the ACPI general purpose event enable bit for the IRQ is enabled, and that IRQ occurs (edge triggered in the preferred embodiment) an ACPI compliant event is generated regardless if the interrupt is masked in interrupt controller 46. Thus, if the ACPI general purpose event enable bit for an IRQ is enabled and that IRQ occurs, the ACPI wake status register becomes true and the corresponding ACPI general purpose status bit for the IRQ is set. A system control interrupt (SCI) may be generated by the core logic to notify the operating system of the event. Therefore, an operating system recognizable event may be generated from a signal other than a dedicated general purpose event signal. The present invention allows a legacy or other IRQ to generate an ACPI event which may be used to wake a computer from a power-on-suspend state. A keyboard, mouse or modem may generate a legacy IRQ and thus generate and ACPI wake up event in the present invention. The present invention may also advantageously be utilized in a working state. For example, run-time IRQ generating devices such as uninterruptable power supplies and temperature sensors may also generate ACPI events by generating an IRQ. Therefore, the present invention is an improvement over existing operating system directed management mechanisms that allow only dedicated event signals to indicate ACPI events. This invention will allow any ISA or PCI card, or a motherboard device, for example, capable of generating an IRQ to generate an ACPI compliant event without the addition of dedicated ACPI event signals. An existing non-dedicated signal such as a legacy IRQ may be used for this purpose.

It will be appreciated to those skilled in the art having the benefit of this disclosure that this invention is believed to be capable of performing creating operating system recognizable system or power management events for devices that do not have dedicated event signals. Various modifications and changes may be made as would be obvious to a person skilled in the art having the benefit of this disclosure. It is intended that the following claims be interpreted to embrace all such modifications and changes, and, accordingly, the specification and drawings are to be regarded in an illustrative rather than a restrictive sense.

What is claimed is:

1. A method for enabling an operating system to wake a computer from a low-power state in response to an interrupt request, the method comprising:

programming core logic to generate a system interrupt in response to the operating system reading a wake-status register;

when said system interrupt is generated in response to the operating system reading said wake-status register, determining if an interrupt request has been generated by one or more wake-up devices; and if an interrupt request has been generated by a wake-up device, causing an event register to indicate a wake-up event has occurred, wherein when the operating system subsequently reads said event register, the operating system will wake the computer from the low-power state.

2. The method as recited in claim 1, wherein said programming is part of a prepare-to-sleep routine executed by the operating system prior to the computer transitioning to the low-power state.

3. The method as recited in claim 2, wherein said prepare-to-sleep routine further comprises enabling at least one interrupt request signal as a resume event, wherein the operating system reads said wake-status register in response to a resume event.

4. The method as recited in claim 3, wherein one of said wake-up devices generates an interrupt request on one of said at least one interrupt request signal, and wherein said core logic recognizes the interrupt request as a resume event and resumes CPU operation.

5. The method as recited in claim 3, wherein said prepare-to-sleep routine further comprises enabling at least one dedicated event signal as a resume event.

6. The method as recited in claim 1, wherein said system interrupt is a system management interrupt (SMI).

7. The method as recited in claim 1, wherein said determining is part of an interrupt handler executed when said system interrupt is generated in response to the operating system reading said wake-status register, the interrupt handler including:

checking for pending keyboard or mouse data; and checking a modem ring indicate status.

8. The method as recited in claim 1, wherein said event register is adapted to indicate a wake-up event has occurred in response to assertion of one or more dedicated signals, and wherein said causing comprises writing a configuration register that causes one of the dedicated signals to appear as if it has been asserted to the event register whereby the event register will indicate a wake-up event has occurred.

9. The method as recited in claim 1, further comprising:

after said causing, programming the core logic to disable generating a system interrupt in response to the operating system reading said wake-status register.

10. The method as recited in claim 1, wherein the operating system executes a control method associated with the wake-up event indicated by said causing, the control method comprises clearing the wake-up event indicated in said event register by said causing to prevent the same wake-up event from being detected again by the operating system.

11. The method as recited in claim 1, wherein the operating system complies with the Advanced Configuration and Power Interface (ACPI) specification.

12. The method as recited in claim 1, wherein said core logic includes the Intel PIIX4 integrated circuit device.

13. The method as recited in claim 1, wherein said wake-up devices includes a keyboard, a mouse, and a modem.

14. A method for simulating an Advanced Configuration and Power Interface (ACPI) compliant wake event in response to wake devices that do not have a dedicated hardware connection to an ACPI general purpose event register in a computer system executing an ACPI compliant operating system, the method comprising:

executing a prepare-to-sleep routine comprising:

programming a core logic device to generate a system management interrupt (SMI) upon accesses to an ACPI WAK_STS register; and programming the core logic device to enable resume events associated with said wake devices that do not have a hardware connection to an ACPI general purpose event register; and in response to said SMI, executing an SMI handler comprising:

determining if the resume event was caused by one of said wake devices that do not have a dedicated hardware connection to an ACPI general purpose event register;

if the resume event was caused by one of said wake devices that do not have a dedicated hardware connection to an ACPI general purpose event register, writing a configuration register in the core logic device that causes the ACPI general purpose event register to indicate the occurrence of an ACPI compliant wake event; and disabling the core logic device from generating the SMI upon subsequent accesses to the ACPI WAK_STS register.

15. The method as recited in claim 14, further comprising executing a control method in response to a subsequent access of the ACPI WAK_STS register by the operating system, the control method comprising:

writing said configuration register in the core logic device to clear indication of the occurrence of an ACPI compliant wake event in the ACPI general purpose event register; and notifying the operating system that a wake event has occurred.

16. The method as recited in claim 14, wherein said wake devices that do not have a dedicated hardware connection to an ACPI general purpose event register include a modem.

17. The method as recited in claim 14, wherein said wake devices that do not have a dedicated hardware connection to an ACPI general purpose event register include a keyboard.

18. The method as recited in claim 14, wherein said wake devices that do not have a dedicated hardware connection to an ACPI general purpose event register include a mouse.

19. The method as recited in claim 14, wherein one of said wake devices that do not have a dedicated hardware connection to an ACPI general purpose event register indicates one of said resume events by asserting a legacy IRQ signal.

20. The method as recited in claim 14, wherein the operating system polls the ACPI WAK_STS register after resume events.

21. A computer system, comprising:

a central processing unit (CPU) configured to execute an operating system;

system memory coupled to said CPU;

core logic coupled to said CPU, said core logic is adapted to receive one or more interrupt request signals, and said core logic is adapted to generate an operating system interrupt in response to an interrupt request on one of said interrupt request signals when the computer system is in a low-power state, wherein the operating system wakes the computer system from the low-power state in response to the operating system interrupt; and one or more wake devices adapted to generate said interrupt request on said interrupt request signals.

22. The computer system as recited in claim 21 wherein said core logic comprises an enable register and a status register for said interrupt request signals, wherein setting a corresponding bit in the enable register enables one of said interrupt request signals to cause said core logic to generate said operating system interrupt and clearing said corresponding bit disables said one of said interrupt request signals from causing said core logic to generate said operating system interrupt.

23. The computer system as recited in claim 22, wherein said enable register is part of an Advanced Configuration and Power Interface (ACPI) general purpose event enable register and said status register is part of an ACPI general purpose event status register.

24. The computer system as recited in claim 21, wherein said interrupt request signals comprise legacy IRQ signals.

25. The computer system as recited in claim 21, further comprising a programmable interrupt controller for interrupting said CPU in response to interrupt requests on said interrupt request signals.

26. The computer system as recited in claim 25, wherein said operating system interrupt is generated regardless of if the corresponding interrupt request signal is masked in the programmable interrupt controller.

27. The computer system as recited in claim 25, further comprising one or more runtime devices that generate interrupt requests on said interrupt request signals when said computer is in a high power state, wherein said core logic is further adapted to generate an operating system interrupt in response to an interrupt request from one of said runtime devices regardless of if the corresponding interrupt request signal is masked in the programmable interrupt controller.

28. The computer system as recited in claim 27, wherein said runtime devices include an uninterruptible power supply (UPS).

29. The computer system as recited in claim 27, wherein said runtime devices include a temperature sensor.

30. The computer system as recited in claim 21, wherein said wake-up devices include a modem.

31. The computer system as recited in claim 21, wherein said wake-up devices include a keyboard.

32. The computer system as recited in claim 21, wherein said wake-up devices include a mouse.

33. The computer system as recited in claim 21, wherein said operating system interrupt is a system control interrupt (SCI).

34. The computer system as recited in claim 21, wherein the operating system is compliant with the Advanced Configuration and Power Interface (ACPI) specification.

35. A computer system, comprising:

a central processing unit (CPU) configured to execute an operating system;

system memory coupled to said CPU;

core logic coupled to said CPU, said core logic is adapted to receive one or more interrupt request signals, and said core logic is adapted to generate an operating system interrupt in response to an interrupt request on one of said interrupt request signals when the computer system is in a low-power state, wherein the operating system wakes the computer system from the low-power state in response to the operating system interrupt, and wherein said core logic comprises an enable register and a status register for said interrupt request signals, wherein setting a corresponding bit in the enable register enables one of said interrupt request signals to cause said core logic to generate said operating system interrupt and clearing said corresponding bit disables said one of said interrupt request signals from causing said core logic to generate said operating system interrupt; and one or more wake devices adapted to generate said interrupt request on said interrupt request signals.

* * * * *